(12) United States Patent
Buckley et al.

(10) Patent No.: US 9,083,509 B2
(45) Date of Patent: Jul. 14, 2015

(54) SYSTEM AND METHOD OF LAWFUL ACCESS TO SECURE COMMUNICATIONS

(71) Applicants: Research In Motion Limited, Waterloo (CA); Certicom Corp., Mississauga (CA)

(72) Inventors: Michael Eoin Buckley, Grayslake, IL (US); Gregory Marc Zaverucha, Redmond, WA (US); Matthew John Campagna, Ridgefield, CT (US)

(73) Assignees: BlackBerry Limited, Waterloo, Ontario (CA); Certicom Corp., Mississauga, Ontario (CA)

( * ) Notice: Subject to any disclaimer, the term of this patent is extended or adjusted under 35 U.S.C. 154(b) by 0 days.

(21) Appl. No.: 13/739,652

(22) Filed: Jan. 11, 2013

(65) Prior Publication Data

US 2013/0182843 A1    Jul. 18, 2013

Related U.S. Application Data (60) Provisional application No. 61/586,061, filed on Jan. 12, 2012.

(51) Int. Cl.
*H04L 29/06* (2006.01)
*H04L 9/08* (2006.01)
*H04L 9/12* (2006.01)

(52) U.S. Cl.
CPC ...... *H04L 9/08* (2013.01); *H04L 9/083* (2013.01); *H04L 9/0869* (2013.01); *H04L 9/12* (2013.01); *H04L 63/0428* (2013.01);
(Continued)

(58) Field of Classification Search
CPC .......................................................... H04L 9/12
USPC .................................................... 380/22, 255
See application file for complete search history.

(56) References Cited

U.S. PATENT DOCUMENTS

| 7,382,881 B2 * | 6/2008 | Uusitalo et al. ............... 380/262 |
| 8,625,787 B2 | 1/2014 | Brusilovsky et al. |
| 2005/0063544 A1 * | 3/2005 | Uusitalo et al. ............... 380/277 |

(Continued)

FOREIGN PATENT DOCUMENTS

| EP | 2472769 | 7/2012 |
| WO | 2011/031439 | 3/2011 |

(Continued)

OTHER PUBLICATIONS

3GPP TS 33.108 V11.1.0; 3rd Generation Partnership Project; Technical Specification Group Services and System Aspects; 3G Security; Handover Interface for Lawful Interception (LI) (Release 11); Sep. 2011; 194 pages.

(Continued)

*Primary Examiner* — Morshed Mehedi
(74) *Attorney, Agent, or Firm* — Fish & Richardson P.C.

(57) ABSTRACT

The present disclosure relates to systems and methods for secure communications. In some aspects, one or more values used to generate an encryption key used to encrypt a packet are stored in a header of the packet. The packet is transmitted with the encrypted data portion in a communication. In some aspects, one or more values used to generate an encryption key are received. The encryption key is regenerated using the one or more values.

7 Claims, 4 Drawing Sheets

(52) U.S. Cl.
CPC ............ *H04L 63/306* (2013.01); *H04L 63/061* (2013.01); *H04L 2209/80* (2013.01)
USPC ........... 380/255; 380/277; 380/278; 713/150; 713/153

(56) References Cited

U.S. PATENT DOCUMENTS

| | | | |
|---|---|---|---|
| 2005/0254656 A1* | 11/2005 | Rose et al. | 380/277 |
| 2006/0037041 A1* | 2/2006 | Zhang | 725/32 |
| 2007/0237144 A1* | 10/2007 | Adhikari et al. | 370/392 |
| 2007/0297418 A1* | 12/2007 | Lee | 370/395.52 |
| 2008/0279705 A1* | 11/2008 | Wago et al. | 417/437 |
| 2009/0220091 A1* | 9/2009 | Howard | 380/277 |
| 2009/0279705 A1 | 11/2009 | Sun et al. | |
| 2010/0185852 A1* | 7/2010 | Ogawa et al. | 713/165 |
| 2010/0205448 A1* | 8/2010 | Tarhan et al. | 713/185 |
| 2010/0268937 A1* | 10/2010 | Blom et al. | 713/153 |
| 2011/0044326 A1* | 2/2011 | Tasker et al. | 370/352 |
| 2011/0055567 A1 | 3/2011 | Sundaram et al. | |
| 2011/0107082 A1* | 5/2011 | Blom et al. | 713/150 |
| 2011/0170694 A1* | 7/2011 | Brusilovsky et al. | 380/278 |
| 2011/0206205 A1* | 8/2011 | Seleznev et al. | 380/278 |
| 2011/0213958 A1* | 9/2011 | Lindholm et al. | 713/153 |
| 2012/0207284 A1* | 8/2012 | Tian et al. | 379/7 |

FOREIGN PATENT DOCUMENTS

| | | |
|---|---|---|
| WO | 2011/087989 | 7/2011 |
| WO | 2011/131070 | 10/2011 |

OTHER PUBLICATIONS

Alcatel-Lucent; "MIKEY-IBAKE and LI Requirements"; Power Point; 2010; 13 pages.

Alcatel-Lucent; "MIKEY-IBAKE and LI"; 3GPP TSG-SA3LI, SA3#41LI; SA3LI11_067; May 10-12, 2011; Philadelphia, US; 6 pages.

Alcatel-Lucent; "MIKEY-IBAKE and LI Approaches"; Power Point; 2010; 10 pages.

Alcatel-Lucent; "MIKEY-IBAKE and LI—Open Issues"; Power Point; 2010; 7 pages.

Alcatel-Lucent; "Pseudo-Random Number Generator LI approach for MIKEY-IBAKE"; 3GPP TSG-SA3LI, SA3#42LI; SA3LI11_100; Aug. 30-Sep. 1, 2011, Malta; 3 pages.

Alcatel Lucent, Rogers Wireless; "Proposed Table of Contents for the Living Document on LI Solutions for IMS Media Plane Security Based on MIKEY-IBAKE"; 3GPP TSG-SA3LI, SA3#43LI; SA3LI11_124; Nov. 15-17, 2011, San Francisco, California; 3 pages.

Baugher et al.; "The Secure Real-Time Transport Protocol (SRTP)"; RFC3711; Network Working Group; Mar. 2004; 57 pages.

Mattsson et al.; "MIKEY-TICKET: Ticket-Based Modes of Key Distribution in Multimedia Internet KEYing (MIKEY)"; RFC 6043; Internet Engineering Task Force (IEFT); Mar. 2011; 59 pages.

McGrew et al.; "Encrypted Key Transport for Secure RTP"; Internet-Draft; Network Working Group; Oct. 26, 2009; 45 pages.

3GPP TR 33.829 V0.0.7, 3rd Generation Partnership Project; Technical Specification Group Services and System Aspects; Extended IMS media plane security features (Release 10); Sep. 2011, 42 pages.

International Search Report and Written Opinion of the International Searching Authority issued in International Application No. PCT/CA2013/050013 on Apr. 9, 2013; 8 pages.

International Search Report and Written Opinion of the International Searching Authority issued in International Application No. PCT/CA2013/050014 on Mar. 27, 2013; 11 pages.

International Search Report and Written Opinion of the International Searching Authority issued in International Application No. PCT/CA2013/050015 on Apr. 17, 2013; 9 pages.

Office Action issued in U.S. Appl. No. 13/739,671 on Apr. 18, 2014; 10 pages.

International Preliminary Report on Patentability under Chapter I issued in International Application No. PCT/CA2013/050013 on Jul. 24, 2014; 7 pages.

International Preliminary Report on Patentability under Chapter I issued in International Application No. PCT/CA2013/050014 on Jul. 24, 2014; 8 pages.

International Preliminary Report on Patentability under Chapter I issued in International Application No. PCT/CA2013/050015 on Jul. 24, 2014; 7 pages.

Office Action issued in U.S. Appl. No. 13/739,671 on Nov. 3, 2014.

Office Action issued in U.S. Appl. No. 13/739,620 on Feb. 11, 2015; 17 pages.

* cited by examiner

SYSTEM AND METHOD OF LAWFUL ACCESS TO SECURE COMMUNICATIONS

CROSS-REFERENCE TO RELATED APPLICATION

This application claims priority to U.S. Provisional Application No. 61/586,061 entitled "System and Method of Lawful Access to Secure Communications," filed on Jan. 12, 2012, the entire contents of which are hereby incorporated by reference.

FIELD OF THE DISCLOSURE

The present disclosure relates to secure communications, and in particular to lawful access to secure communications.

BACKGROUND

Lawful interception requirements for encrypted services such as enhanced IMS Media Security are detailed in Section 5.7 of Third Generation Partnership Project (3GPP) Technical Specification (TS) 33.106. In one requirement, interception shall be performed in such a manner as to avoid detectability by the target or others. In another requirement, an encryption solution shall not prohibit commencement of interception and decryption of an existing communication.

In the Multimedia Internet KEYing Ticket (MIKEY-TICKET) key exchange protocol, an initiator user equipment (UE) generates a random number RANDRi which is included as a field in a ticket sent to a Key Management Service (KMS). The KMS returns to the initiator UE a generating key that is to be used to generate a Traffic Encryption Key (TEK) for secure communication with a responder UE. The generating key is called a TEK Generation Key (TGK). The RANDRi value together with a Crypto Session Identity (CS ID) and the TGK are used by the initiator UE and by a responder UE to generate the TEK used for ciphering in Secure Realtime Transport Protocol (SRTP) communication between the initiator UE and the responder UE.

The RANDRi and TGK information is discarded by the KMS when replying to the initiator UE. As such, information to regenerate the TEK for lawful interception is discarded by, and becomes unavailable to, the KMS. Therefore, mid-call interception of MIKEY-TICKET TEK based SRTP communications between the initiator UE and the responder UE is currently possible only through re-keying. Unfortunately, re-keying is detectable by both the initiator UE and the responder UE, thereby breaking the lawful interception requirements listed above.

BRIEF DESCRIPTION OF THE DRAWINGS

Embodiments will now be described by way of example only, with reference to the attached drawings in which.

DETAILED DESCRIPTION

According to one aspect of the present disclosure, there is provided a method for secure communication. The method comprises storing in a header of a packet one or more values used in generation of an encryption key used to encrypt the packet, and transmitting the packet with the encrypted data portion in a communication.

According to another aspect of the present disclosure, there is provided a method for secure communication. The method comprises storing a nonce value, a crypto session identity (CS ID), and a traffic encryption key generation key (TGK) in a master key identifier (MKI) field of a header of a secure realtime transport protocol (SRTP) packet used in a communication following the generation of a traffic encryption key (TEK), encrypting at least a data portion of the SRTP packet using the TEK, and transmitting the SRTP packet with the encrypted data portion in the communication. The nonce value is associated with a MIKEY-TICKET protocol key exchange initiator, the CS ID is associated with the communication, the TGK is generated by a key management system (KMS), and the TEK is associated with the MIKEY-TICKET protocol.

According to another aspect of the present disclosure, there is provided a communication device comprising a processor and a memory including stored instructions for secure communication. The communication device is configured to store a nonce value, a crypto session identity (CS ID), and a traffic encryption key generation key (TGK) master key identifier (MKI) field of a packet header of a secure real-time transport protocol (SRTP) packet used in a communication following the generation of a traffic encryption key (TEK), encrypt at least a data portion of the SRTP packet using the TEK, and transmit the SRTP packet with the encrypted data portion in the communication. The nonce value is associated with a MIKEY-TICKET protocol key exchange initiator, the CS ID is associated with the communication, the SRTP TGK is generated by a key management system (KMS), and the TEK is associated with the MIKEY-TICKET protocol.

According to another aspect of the present disclosure, there is provided a method for generating (or regenerating) an encryption key. The method comprises receiving one or more values used in generation of an encryption key, and generating (or regenerating) the encryption key using the one or more values.

According to another aspect of the present disclosure, there is provided a method for generating (or regenerating) a traffic encryption key (TEK) used for secure communication. The method comprises receiving a nonce value associated with a MIKEY-TICKET protocol key exchange initiator, a crypto session identity (CS ID) associated with a secure communication, and a traffic encryption key generation key (TGK), and generating (or regenerating) the TEK using nonce value, CS ID and the TGK. The TGK is generated by a key management system (KMS), and the TEK is associated with a MIKEY-TICKET protocol.

According to another aspect of the present disclosure, there is provided a key management service (KMS) equipment comprising a processor and a memory including stored instructions for secure communication. The KMS equipment is configured to receive a nonce value, a crypto session identity (CS ID) and a traffic encryption key generation key (TGK), and generate (or regenerate) the TEK using nonce value, CS ID and the TGK. The nonce value is associated with a MIKEY-TICKET protocol key exchange initiator, the CS ID is associated with a secure communication, the TGK is generated by a key management system (KMS), and the TEK is associated with a MIKEY-TICKET protocol.

According to another aspect of the present disclosure, there is provided a first user equipment comprising a processor and a memory including stored instructions for secure communication with a second user equipment. The first user equipment is configured to generate at least a first value used in generation of an encryption key, transmit the first value to a key management service (KMS) equipment, receive from the KMS equipment at least a second value used in the generation of said encryption key, store in the header of a packet at least the first value and the second value which are used in the generation of the encryption key, encrypt a data portion of the packet using the encryption key, and transmit the packet with the encrypted data portion in a communication to the second user equipment.

A system and method of lawful access to secure communication is provided. In the following description, for the purposes of explanation, specific details are set forth in order to provide a thorough understanding of the present disclosure. It will be apparent, however, to one skilled in the art that the technique may be practiced without these specific details. In other instances, well-known structures and devices are shown in block diagram form in order to avoid unnecessarily obscuring the present disclosure.

Some of the needs identified in the foregoing Background, and other needs and objects that will become apparent from the following description, are achieved by, in one aspect, a system and method of lawful access to secure communication. In other aspects, the disclosure encompasses apparatus and a computer-readable medium configured to carry out the foregoing actions, as well as a data carrier carrying thereon or therein data indicative of instructions executable by processing means to cause those means to carry out the foregoing actions. Examples are CD-ROMs, memory sticks, dongles, transmitted signals, downloaded files, etc. In particular, the method may be implemented in a mobile telecommunications device, with or without voice capabilities, or other electronic devices such as handheld or portable devices.

Figure 1:
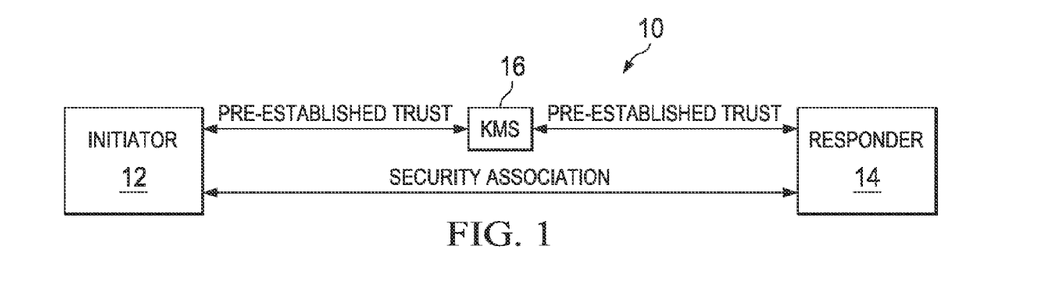
FIG. 1 illustrates an example of a trust model 10, in association with the MIKEY-TICKET key exchange protocol.

In overview, existing problems are overcome according to the approaches described below. In the diagram of FIG. 1 and consequent figures, like reference numerals denote like components/messages and are not described unless repetition is required.

A law enforcement agency (LEA) may sometimes require the interception of communications between parties when one or more of the parties are a target under investigation. Unfortunately, when an electronic communication is secured using encryption, the LEA does not have easy access to the communication.

Lawful interception requirements for encrypted services such as enhanced IMS Media Security are detailed in Section 5.7 of Third Generation Partnership Project (3GPP) Technical Specification (TS) 33.106. In one requirement of lawful interception, interception should be performed in a manner that avoids detectability by a target or by others. In particular, there should not be a significant difference in latency during call setup or during communications compared to a non-intercepted communication. Also, interception of a target should not prevent the use of key exchange applications which provide a user key confirmation mechanism. In another requirement of lawful interception, an encryption solution should not prohibit commencement of interception and decryption of an existing communication.

One type of key exchange protocol in use today is the Multimedia Internet KEYing Ticket (MIKEY-TICKET) key exchange protocol. FIG. 1 illustrates an example of a trust model 10, in association with the MIKEY-TICKET key exchange protocol. In the MIKEY-TICKET key exchange protocol, an initiator 12 wishes to communicate with a responder 14. Both the initiator 12 and the responder 14 have pre-established trust relationships with a trusted third party, the Key Management Service (KMS) 16. In some instances, this includes a secure channel between the UE (of the initiator 12 or responder 14) and KMS 16, which may be facilitated with a shared key (the shared key is used to encrypt and authenticate communications using a symmetric key encryption algorithm). The pre-established trust relationships may be used to establish a security association between the initiator 12 and the responder 14. The trust model 10 may be modified to include a plurality of responders (i.e., a group of parties) and a plurality of KMS (i.e., one KMS for each responder or groupings of responders).

Initiators 12 and responders 14 may be any party wishing to communicate securely, including via electronic devices. In the following description, initiators 12 and responders 14 are described from the view of user equipment (UE) and are referred to as initiator UEs 12 and responder UEs 14.

Figure 2:
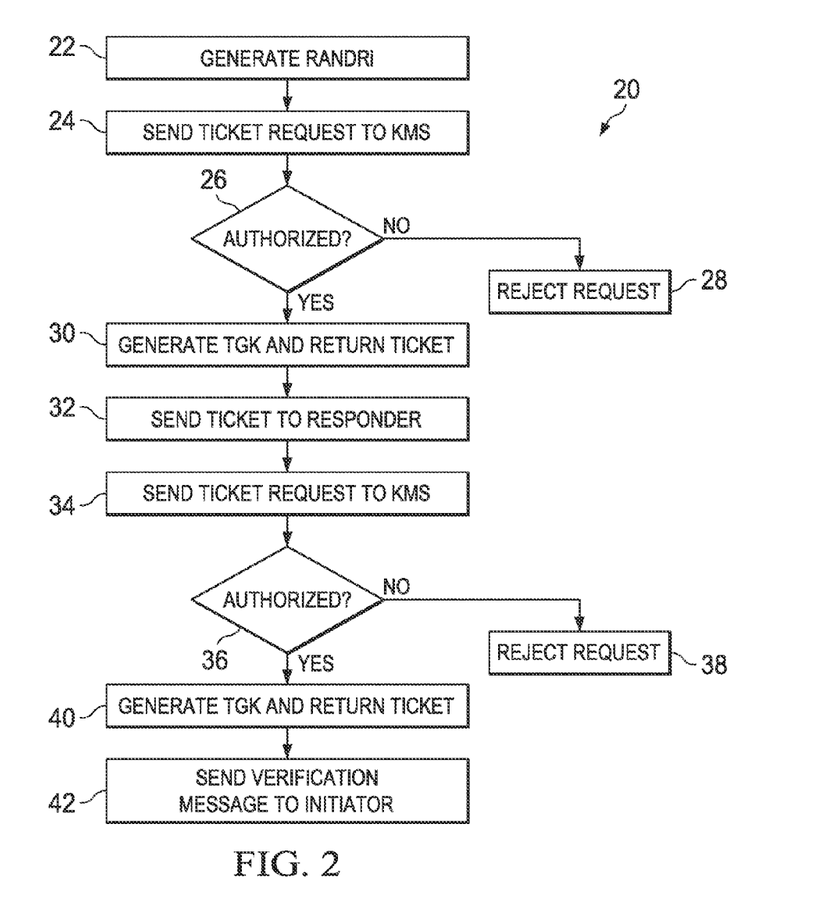
FIG. 2 illustrates in a flow diagram, an example of a method of key generation, in accordance with the MIKEY-TICKET key exchange protocol.

FIG. 2 illustrates in a flow diagram, an example of a method of key generation (20), in accordance with the MIKEY-TICKET key exchange protocol. The method (20) comprises an initiator UE 12 generating a random number (22), RANDRi, which is included in a field in a ticket request to be sent to the KMS 16. Next, the initiator UE 12 sends the ticket request (24), i.e., by transmitting a REQUEST_INIT message, to the KMS 16. The ticket request includes session information, such as the identities of the parties, that is protected via a message authentication code (MAC) based on the pre-existing trust relationship between the initiator UE 12 and the KMS 16. One or more keys for one or more parties may be requested in the ticket request. If the request is not authorized (26), the KMS 16 rejects the request (28). If the request is authorized (26), the KMS 16 generates the requested one or more keys, encodes the keys in a ticket, and returns the ticket (30), i.e., by transmitting a REQUEST_RESP message, to the initiator UE 12. Each key in the one or more keys generated in this step may be used to generate a Traffic Encryption Key (TEK) for secure communication with a responder UE 14. A generating key is called a TEK Generation Key (TGK).

The initiator UE 12 next sends the ticket to a responder UE 14 (32) by transmitting a TRANSFER_INIT message to the responder UE 14. The TRANSFER_INIT message is encoded using a MAC based on the TGK. The header of the TRANSFER_INIT may also include a Crypto Session Identity (CD ID). Once receiving the ticket, the responder UE 14 sends the ticket, by transmitting a RESOLVE_INIT message, to the KMS 16 (34) to obtain the relevant TGK. The RESOLVE_INIT message is protected via a MAC based on the pre-existing trust relationship between the responder UE 14 and the KMS 16. If the responder UE 14 is not authorized to receive the TGK (36), the KMS 16 rejects the request (38). If the responder UE 14 is authorized to receive the TGK (36) encoded in the ticket, the KMS 16 resolves the ticket and sends the TGK and additional information (40), by transmitting a RESOLVE_RESP message, to the responder UE 14. The responder UE 14 then sends a verification message (42), by transmitting a TRANSFER_RESP message, to the initiator UE 12. The method (20) is complete and both the initiator UE 12 and responder UE 14 have the shared TGK.

Figure 3:
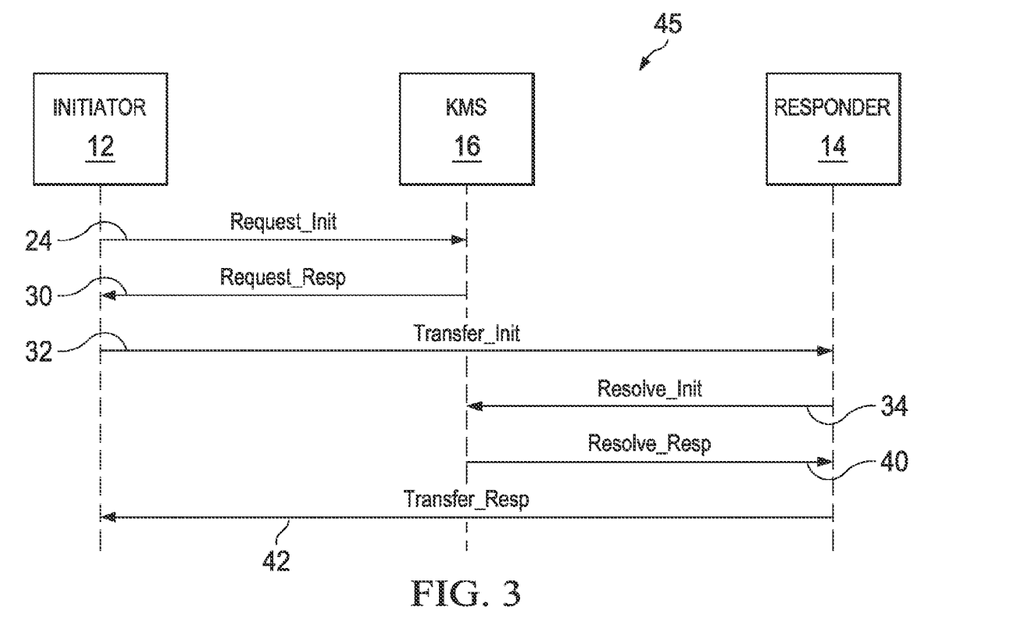
FIG. 3 illustrates in a message flow diagram, an example of a key exchange between an initiator UE and a responder UE, in accordance with the MIKEY-TICKET protocol.

FIG. 3 illustrates in a message flow diagram, an example of a key exchange (45) between an initiator UE 12 and a responder UE 14, in accordance with the MIKEY-TICKET protocol. The initiator UE 12 transmits the REQUEST_INIT message to the KMS 16 (24). The KMS transmits the REQUEST_RESP to the initiator UE 12 (30). The initiator UE 12 transmits the TRANSFER_INIT message to the responder UE 14 (32). The responder UE 14 transmits the RESOLVE_INIT message to the KMS 16 (34). The KMS 16 transmits the RESOLVE_RESP to the responder UE 14 (40). The responder UE 14 transmits the TRANSFER_RESP message to the initiator UE 12 (42).

The RANDRi value together with a CS ID and the TGK are used by the initiator UE 12 and by the responder UE 14 to generate the TEK used for ciphering in Secure Realtime Transport Protocol (SRTP) communication between the initiator UE 12 and a responder UE 14. The SRTP includes a process for re-keying, i.e., generating a new TEK, including through the regeneration of the TGK via the MIKEY-TICKET protocol.

Typically, the RANDRi and TGK information is discarded by the KMS 16 when replying to the initiator UE 12. As such, information to regenerate the TEK for lawful interception is discarded by, and becomes unavailable to, the KMS 16. Therefore, mid-call interception of MIKEY-TICKET TEK based SRTP communications between the initiator UE 12 and the responder UE 14 is currently possible only through re-keying.

Unfortunately, re-keying is detectable by both the initiator UE 12 and the responder UE 14, thereby breaking the lawful interception requirements listed above. Furthermore, an alternative of storing in the KMS 16 the information required for lawful intercept re-keying may not be a practical solution for a KMS 16 where there may be a high volume of ticket requests, and when combined with the fact that the duration of a session may be unknown or indefinite. Moreover, the CS ID shared in the TRANSFER_INIT and TRANSFER_RESP message would also need to be stored in the KMS 16.

Figure 4:
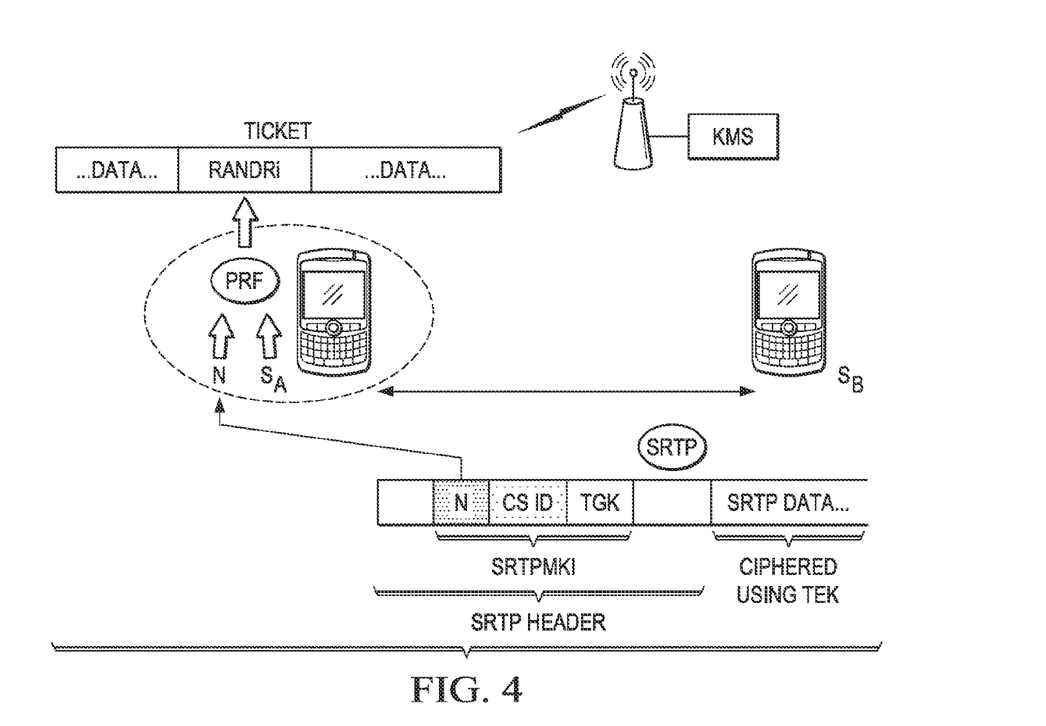
FIG. 4 illustrates one approach to enabling lawful interception for MIKEY-TICKET key exchange in enhanced IMS media security, in accordance with an embodiment of the present disclosure.

FIG. 4 illustrates one approach to enabling full lawful interception for MIKEY-TICKET key exchange in enhanced IMS media security, in accordance with an embodiment of the present disclosure. Each UE 12, 14 is assigned a unique secret key $S_A$, $S_B$, respectively, that are stored in a secure database only accessible by the KMS 16. The secret key $S_A$ stored in the secure database accessibly by the KMS 16, along with a nonce value N that could be contained in every SRTP packet header, is used to regenerate the RANDRi value contained in a TICKET.

One possible field that can be used for this purpose is the SRTP Master Key Identifier (MKI) field in the SRTP Header. While currently an optional field it can be made a requirement as an example for services utilizing enhanced IMS media plane security. As shown in FIG. 4, other values that can be stored in the SRTP MKI field include the CS ID and the TGK; completing the information needed by the KMS 16 to regenerate the TEK. Although the SRTP Header is transmitted openly, the nonce N, CS ID and TGK can be encrypted with the encryption approach used for the initiator UE 12 MIKEY-TICKET request before insertion in the SRTP MKI which is known to the KMS 16. Advantageously, even if the SRTP MKI field is decrypted by an attacker, secrecy is maintained as the secret key $S_A$ remains unknown.

In the case of lawful interception, the LEA observes the SRTP communication at any time, extracts the MKI field from the header of a SRTP packet, and communicates at least the SRTP MKI field to the KMS 16. Since the KMS 16 is given the SRTP MKI field and has the secret key $S_A$ stored, the original RANDRi, CS ID and TGK values, and subsequently the SRTP session key TEK, can be regenerated. The KMS 16 could decrypt the SRTP MKI field to obtain the information required to regenerate the TEK. A bit value may also be included in the MKI field that identifies the initiator UE 12 from the parties involved in the communication of the STRP packet. For example, one of the values of zero (0) or one (1) could represent that the sender (or alternatively the recipient) of the STRP packet is the initiator 12. Thus, the KMS 16 would then be able to identify the correct secret key $S_A$ of the initiator 12 that is stored in the repository of the KMS 16. The bit value is one possible way of identifying the initiator 12. Other ways may also be used.

Figure 5:
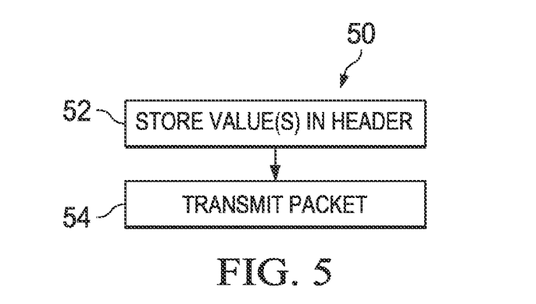
FIG. 5 illustrates in a flow diagram, an example of a method of providing lawful interception information, in accordance with an embodiment of the present disclosure.

FIG. 5 illustrates in a flow diagram, an example of a method of providing lawful interception information (50), in accordance with an embodiment of the present disclosure. The method (50) comprises storing in a header of a packet one or more values used in generation of an encryption key used to encrypt the packet (52). The packet is then transmitted in a communication (54). At least the data portion of the packet may also be encrypted using the encryption key prior to transmission in the communication. This method is performed by both initiator UEs 12 and responder UEs 14 on all packets in communications subsequent to obtain the TEK. Portions of the packet other than the data portion may be unencrypted or encrypted using the same or another key.

The communications may be SRTP communications where the packet is a SRTP packet, the header is an SRTP header and the one or more values are stored in a SRTP MKI field of the SRTP header. The one or more values may include a nonce value, a CS ID and a TGK. Using a known pseudo random function, the nonce value N, together with a secret key $S_A$, is used by an initiator UE 12 to generate the RANDRi sent to the KMS 16 in the REQUEST_INIT message (24). The TGK is the key provided by the KMS 16 in the REQUEST_RESP message (30) and used by both the initiator UE 12 and responder UE 14, to generate the encryption key TEK.

Advantageously, the MIKEY-TICKET key exchange protocol is enhanced to meet the mid-call interception requirement. The reuse of the SRTP MKI field from the SRTP Header which along with a UE specific secret key $S_A$ can be used to enable lawful intercept.

Figure 6:
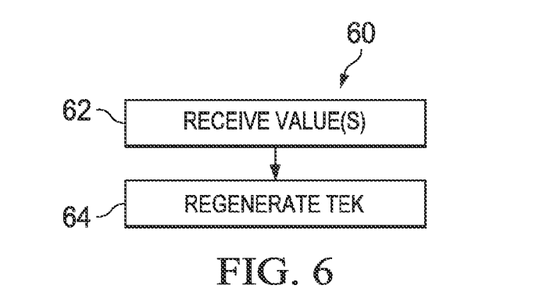
FIG. 6 shows in a flow diagram an example of method for key regeneration, in accordance with an embodiment of the present disclosure.

FIG. 6 shows in a flow diagram an example of method for key regeneration (60), in accordance with an embodiment of the present disclosure. The method (60) comprises obtaining one or more values used in generation of an encryption key (62). The one or more values are then used to regenerate the encryption key (64). Other steps may be added to the method (60) including receiving a SRTP packet and parsing a SRTP MKI field from the SRTP packet to obtain the one or more values. The method (60) may be performed by a KMS 16 in response to a request for the regeneration of a TEK by a law enforcement agency (LEA). The LEA intercepts a packet of a communication of a target UE and may provide either the entire packet to a KMS 16 or the STRP MKI field from the packet header. If the target of the LEA is the initiator 12, the LEA may also provide subscriber information (such as a name, phone number, etc.) or a device identifier (such as a hardware MAC address of a network interface) to the KMS 16 to identify the initiator UE 12 so that the KMS 16 can correctly select the appropriate secret key $S_A$ to regenerate the RANDRI. Alternatively, the subscriber information may be provided as a bit value in the MKI field that identifies the initiator UE 12 as described above. The one or more values use to generate the TGK may include the nonce value, a CS ID, the TGK and the subscriber information described above.

Figure 7:
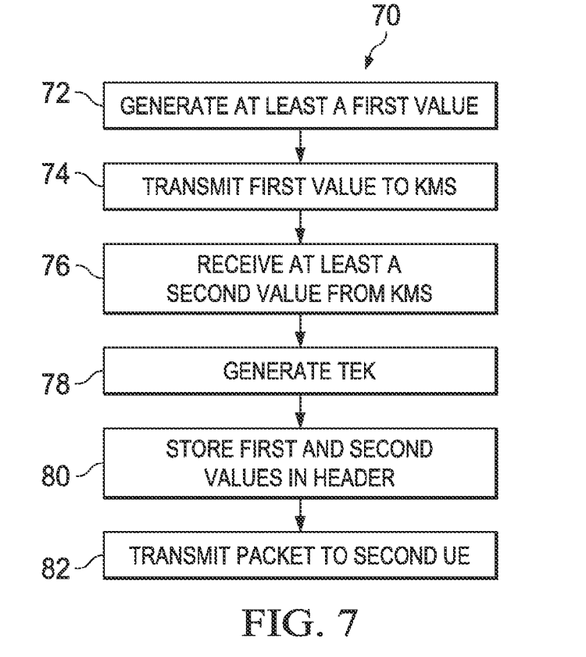
FIG. 7 shows in a flow diagram an example of a method for enabling lawful access to a secure communication, in accordance with an embodiment of the present disclosure.

FIG. 7 shows in a flow diagram an example of a method for enabling lawful access to a secure communication (70), in accordance with an embodiment of the present disclosure. The method (70) comprises a first UE generating at least a first value (72) used in generation of an encryption key. Next, the first value is transmitted to a KMS equipment (74). At least a second value is then received from the KMS equipment (76). This second value is also used in the generation of the encryption key. The TEK is regenerated using the first and second value (78). The first value and the second value are stored in a header of a packet (80). The data portion of the packet may be encrypted using the encryption key. Next, the packet is transmitted in a communication to a second UE (82). The first value may be the RANDRi generated by the first UE. The second value may be the TGK generated by the KMS equipment. The encryption key is the TEK generated by a function involving the RANDRi and the TGK.

Figure 8:
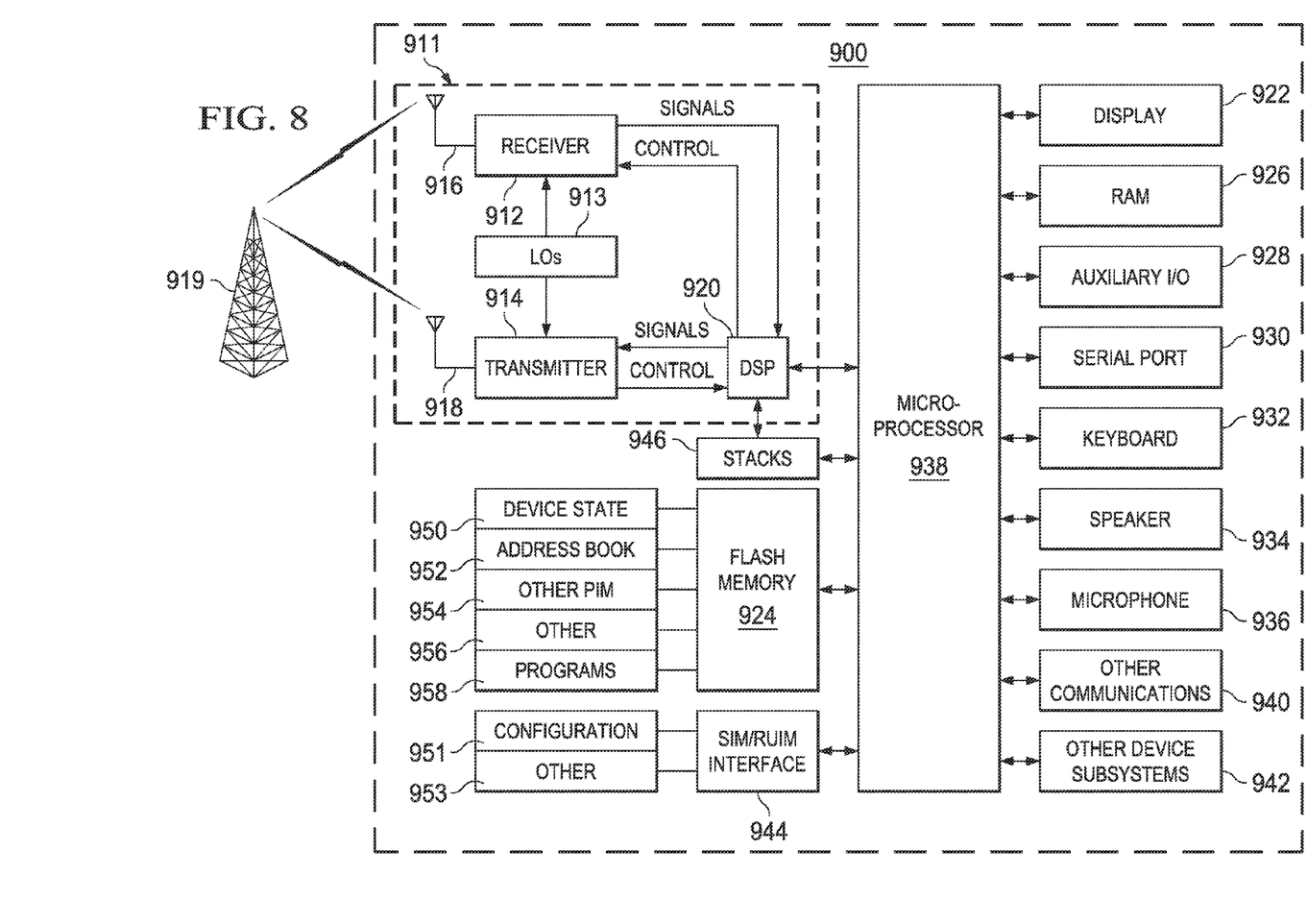
FIG. 8 is a block diagram illustrating a mobile device.

FIG. 8 is a block diagram illustrating a mobile device, which can act as a UE and co-operate with the apparatus and methods of FIGS. 1 to 7, and which is an exemplary wireless communication device. Mobile station 900 is preferably a two-way wireless communication device having at least voice and data communication capabilities. Mobile station 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and processing means such as a processing module such as a digital signal processor (DSP) 20. As will be apparent to those skilled in the field of communications, the particular design of the communication subsystem 911 will be dependent upon the communication network in which the device is intended to operate. For example, mobile station 900 may include a communication subsystem 911 designed to operate within the Mobitex™ mobile communication system, the DataTAC™ mobile communication system, GPRS network, UMTS network, EDGE network or LTE network.

Network access requirements will also vary depending upon the type of network 902. For example, in the Mobitex and DataTAC networks, mobile station 900 is registered on the network using a unique identification number associated with each mobile station. In LTE, UMTS and GPRS networks, however, network access is associated with a subscriber or user of mobile station 900. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 900 will be unable to carry out any other functions involving communications over the network 902. The SIM interface 944 is normally similar to a card-slot into which a SIM card can be inserted and ejected like a diskette or PCMCIA card. The SIM card can have approximately 64K of memory and hold many key configuration 951, and other information 953 such as identification, and subscriber related information.

When required network registration or activation procedures have been completed, mobile station 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 8, analog to digital (A/D) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile station 900 preferably includes processing means such as a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 10 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile station. A predetermined set of applications that control basic operations, including at least data and voice communication applications for example, will normally be installed on mobile station 900 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile station user's corresponding data items stored or associated with a host computer system. Further applications may also be loaded onto the mobile station 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile station 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile station 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile station 900 is similar, except that received signals would preferably be output to a speaker 934 and signals for transmission would be generated by a microphone 936. Alternative voice or audio I/O subsystems, such as a voice message recording subsystem, may also be implemented on mobile station 900. Although voice or audio signal output is preferably accomplished primarily through the speaker 934, display 922 may also be used to provide an indication of the identity of a calling party, the duration of a voice call, or other voice call related information for example.

Serial port 930 in FIG. 8, would normally be implemented in a personal digital assistant (PDA)-type mobile station for which synchronization with a user's desktop computer (not shown) may be desirable, but is an optional device component. Such a port 930 would enable a user to set preferences through an external device or software application and would extend the capabilities of mobile station 900 by providing for information or software downloads to mobile station 900 other than through a wireless communication network. The alternate download path may for example be used to load an encryption key onto the device through a direct and thus reliable and trusted connection to thereby enable secure device communication.

Other communications subsystems 940, such as a short-range communications subsystem, is a further optional component which may provide for communication between mobile station 900 and different systems or devices, which need not necessarily be similar devices. For example, the subsystem 940 may include an infrared device and associated circuits and components or a Bluetooth™ communication module to provide for communication with similarly enabled systems and devices.

When mobile device 900 is used as a UE, protocol stacks 946 include apparatus and a method for a system and method of user equipment state transition.

In the foregoing specification, the disclosure has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or MKS or other user equipment or access network components, a combination of multiple such components for example in communication with one another or a sub-network or full network of such components.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The invention claimed is:

1. A method for secure communication, the method comprising:
    storing in a header of a packet one or more values used in generation of an encryption key used to encrypt the packet, wherein the one or more values comprise a nonce value that is combined with a secret key to generate a random number, wherein the random number is used to generate the encryption key, and wherein the packet is a secure real-time transport protocol (SRTP) packet and the header is an SRTP header;
    encrypting at least a data portion of the packet using the encryption key; and
    transmitting the packet with an encrypted data portion in a communication.

2. The method of claim 1, wherein the one or more values are stored in a master key identifier (MKI) field of the SRTP header.

3. The method of claim 1, wherein the one or more values further comprise a crypto session identity (CS ID) and a traffic encryption key generation key (TGK).

4. The method of claim 3, wherein the nonce value comprises a value associated with an initiator of the communication.

5. The method of claim 1, wherein the encryption key is a traffic encryption key generated following a MIKEY-TICKET protocol.

6. The method of claim 1, wherein the one or more values are stored in the header to assist with lawful access to the secured communication.

7. The method of claim 1, wherein some of the one or more values are not required for the secured communication.

* * * * *